US009857097B2

(12) United States Patent
Dunn

(10) Patent No.: US 9,857,097 B2
(45) Date of Patent: Jan. 2, 2018

(54) ARTIFICIAL LIGHT AND EVACUATED TUBE BOILER

(71) Applicant: Brian Dunn, St. Louis, MO (US)

(72) Inventor: Brian Dunn, St. Louis, MO (US)

( * ) Notice: Subject to any disclaimer, the term of this patent is extended or adjusted under 35 U.S.C. 154(b) by 1003 days.

(21) Appl. No.: 14/174,270

(22) Filed: Feb. 6, 2014

(65) Prior Publication Data
US 2014/0226958 A1    Aug. 14, 2014

Related U.S. Application Data

(60) Provisional application No. 61/850,333, filed on Feb. 14, 2013.

(51) Int. Cl.
F24C 1/00 (2006.01)
F24J 2/05 (2006.01)
F24H 1/00 (2006.01)
F24J 2/44 (2006.01)
F24H 1/16 (2006.01)
F24J 2/34 (2006.01)

(52) U.S. Cl.
CPC ............ *F24J 2/055* (2013.01); *F24H 1/0018* (2013.01); *F24J 2/44* (2013.01); *F24D 2220/07* (2013.01); *F24H 1/162* (2013.01); *F24H 2250/14* (2013.01); *F24J 2/345* (2013.01); *Y02B 10/22* (2013.01); *Y02E 10/44* (2013.01)

(58) Field of Classification Search
CPC .......... F24H 9/12; F24H 1/0018; F24H 1/162; F24H 2250/14; F24J 2/055; F24J 2/44; F24J 2/345

USPC ........ 126/600, 610, 635, 640; 392/307, 391, 392/407, 411, 483, 486
See application file for complete search history.

(56) References Cited

U.S. PATENT DOCUMENTS

| 3,906,188 A * | 9/1975 | Gamell ..................... F01D 1/36 122/234 |
| 3,952,724 A * | 4/1976 | Pei ........................... F24J 2/055 126/655 |
| 4,299,203 A * | 11/1981 | Skopp ...................... F24J 2/055 126/569 |
| 4,797,535 A | 1/1989 | Martin |
| 5,054,107 A | 10/1991 | Batchelder |
| 5,559,924 A | 9/1996 | Kadotani |
| 2005/0185941 A1* | 8/2005 | Mills ........................ F21V 29/59 392/407 |

(Continued)

Primary Examiner — Thien S Tran
(74) Attorney, Agent, or Firm — Randolph Bretton; The Law Office of Randolph Bretton

(57) ABSTRACT

An evacuated tube boiler comprised of one or more evacuated tubes and a header, operatively connected to form a common internal volume. The internal volume further containing a first heating fluid. A conduit system conducting a second heating fluid through the header and first heating fluid. One or more artificial light sources in proximity to the evacuated tubes. In operation, the artificial light sources radiate light and/or thermal energy to the evacuated tubes whereby the first heating fluid is efficiently heated. The conduit system conducts the second heating fluid through the header and first heating fluid, whereby heat from the first heating fluid is transferred to the second heating fluid. The conduit system conducts the second heating fluid to the point of use. The apparatus may be used in a hydronic boiler heating system for heating a dwelling.

19 Claims, 4 Drawing Sheets

(56) References Cited

U.S. PATENT DOCUMENTS

| | | | |
|---|---|---|---|
| 2009/0074391 A1* | 3/2009 | Tsai | F24H 9/0021 392/451 |
| 2010/0319681 A1* | 12/2010 | Li | F24J 2/055 126/640 |
| 2011/0058797 A1* | 3/2011 | Servidio | F24D 11/002 392/411 |
| 2012/0132195 A1 | 5/2012 | Chen | |

* cited by examiner

ARTIFICIAL LIGHT AND EVACUATED TUBE BOILER

CROSS REFERENCE TO RELATED APPLICATIONS

This application claims priority to U.S. provisional application Ser. No. 61/850,333, filed Feb. 14, 2013, and incorporated herein by reference in its entirety.

FIELD OF THE INVENTION

The invention relates to boilers, or systems for heating water or other fluids.

BACKGROUND OF THE INVENTION

Most modern boilers typically used for hydronic heating are comprised of a gas fired or electric heating element, which heats water to a desired temperature, typically between about 100° F. to about 200° F., and then circulates the water through a conduit system to locations where heating is desired, wherein a means of heat exchange, typically a radiator, provides heat to the ambient air, thus warming the area or dwelling. With the cost of gas and electricity continuously increasing, this method of heating has become expensive to operate. There is a continuous desire to develop more efficient methods of converting energy in to heat, in particular with regard to electric energy.

In one example, U.S. Pat. No. 5,559,924 discloses a system using a radiant heater to heat a liquid through an internal pipe. In another example, U.S. Pat. No. 5,054,107 describes a system using a set of lamps emitting energy to heat a liquid. U.S. Pat. No. 4,797,535 describes a system which utilizes a set of halogen lamps emitting energy directly into a fluid reservoir. Each of these systems suffers from various inefficacies. In particular, these systems require a substantial framework to house the apparatus which does not aid in transforming electrical energy into heat.

One cost efficient method of heating is the use of solar energy. Some solar heating systems make use of solar cells which convert solar energy into electricity. These systems are expensive to manufacture and install. Some solar heating systems use solar energy directly as a means for heating water. Whereas this can be an inexpensive way to produce heated water, direct solar heating systems suffer from several drawbacks. Direct solar heaters typically require a reservoir to contain heated water for periods when the sun is not available. In addition, these systems require large panels or surfaces exposed to the sun that are external to the dwelling and are inconvenient install and difficult to maintain. These types of solar heaters are better suited for heating water for residential use, as it may be difficult to reach and maintain the temperatures required for a hydronic heating system without the extensive use of large solar panels. All forms of solar energy systems are ultimately tied to the availability of the sun, which is unavailable at night, may be greatly diminished in bad weather.

The Inventor has made the surprising discovery that artificial light in combination with evacuated tubes may be adapted for hydronic heating with high efficiency. The inventor discloses a surprisingly efficient means of converting electrical energy into heated fluid, appropriate for any use, including heating a dwelling. It combines the efficiency of solar heating with the convenience of internal maintenance, and may be easily adapted to existing systems.

SUMMARY

An evacuated tube boiler comprised of one or more evacuated tubes and a header, operatively connected to form a common internal volume. The internal volume containing a first heating fluid and at least one element of a conduit system. The conduit system further comprising a second heating fluid. One or more artificial light sources are in proximity to the evacuated tubes. Wherein the evacuated tubes capture thermal energy from the artificial light sources thereby heating the first heating fluid to about 90 degrees Fahrenheit or greater, wherein the first heating fluid transfers heat to the second heating fluid within the conduit system, wherein the conduit system conducts the second heating fluid from the header to the point of use. In one embodiment, the evacuated tube boiler may be used to heat a dwelling.

DESCRIPTION OF PREFERRED EMBODIMENTS

Figure 5:
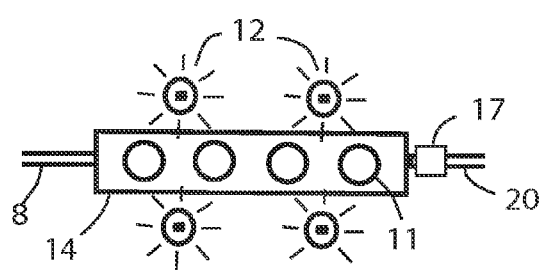
FIG. 5 illustrates a bottom view of the boiler of FIG. 1.
Figure 6:
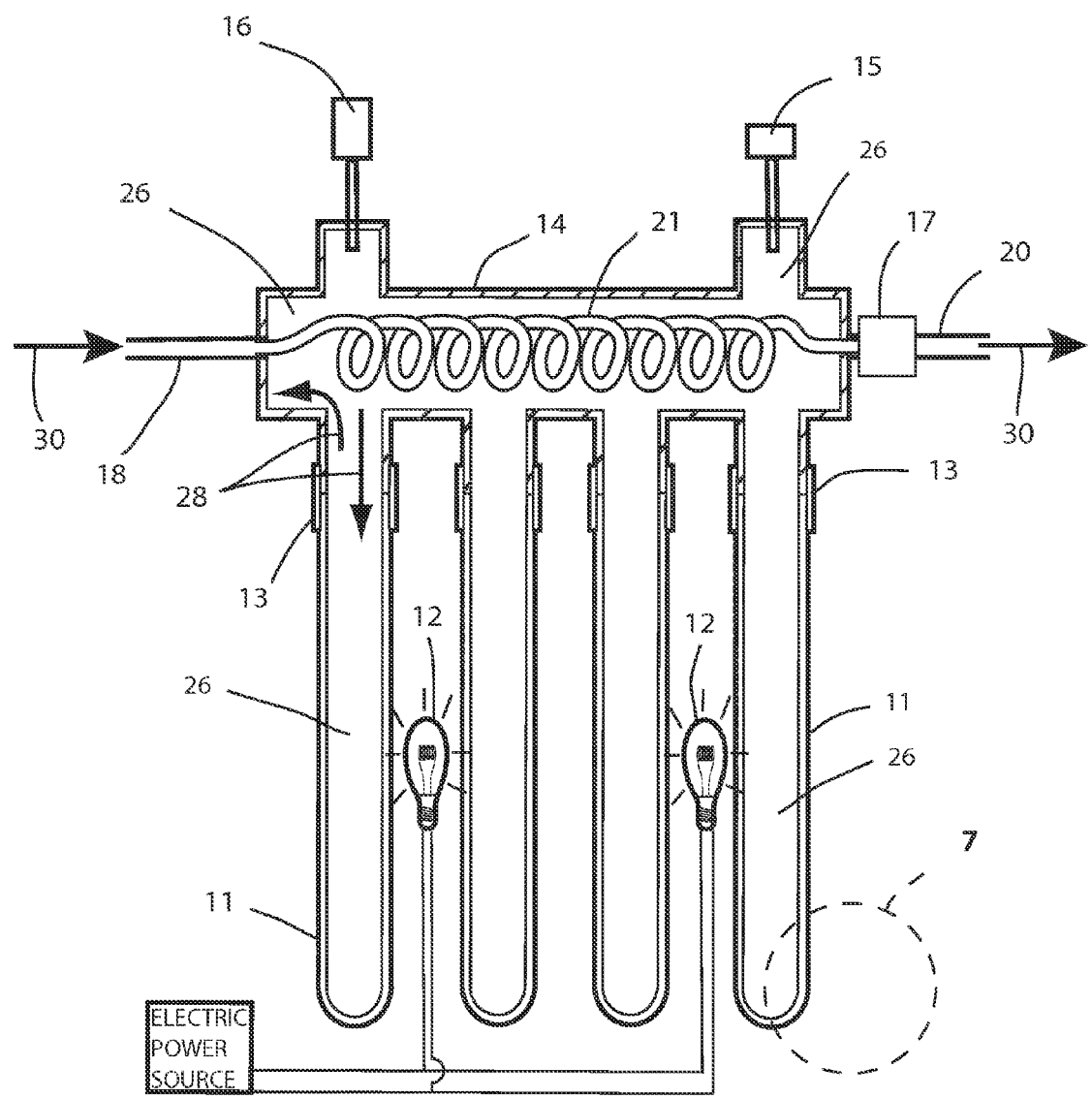
FIG. 6 illustrates a cross-section view of the header and evacuated tubes on the plane indicated in FIG. 4.

Referring now to the drawings and more particularly FIGS. 1-13. Shown are embodiments which comprise one or more evacuated tubes (11) and a header (14). Also illustrated in FIGS. 1-13 are one or more artificial light sources (12) in proximity to the evacuated tubes (11). FIG. 6 shows a cross section of the header (14) and evacuated tubes (11) forming an internal volume (26). FIG. 6 also shows a first heating fluid and its direction of flow represented by first heating fluid arrows (28) and hereafter referred to as the first heating fluid (28). FIG. 6 shows a second heating fluid and its direction of flow through the conduit system represented by second heating fluid arrows (30) and hereafter referred to as the second heating fluid (30). The internal volume (26) contains the first heating fluid (28) and the header conduit (21). The header conduit (21) conducts a second heating fluid (30) from influent conduit (18) through the header (14) and first heating fluid (28) to the effluent conduit (20).

The artificial light source, when activated, radiates light and/or thermal energy to the evacuated tubes (11), where it is efficiently retained and absorbed by the first heating fluid (28) within in the internal volume (26) of the evacuated tube (11). The first heating fluid (28) having been heated by the artificial light source, flows through the internal volume (26) to the header (14), where it transfers heat to the second heating fluid (30) within the header conduit (21). The effluent conduit (20) transports the second heating fluid (30), having been heated by the first heating fluid (28), to a point of use or storage. The influent conduit (18) conducts second heating fluid (30) to the header conduit (21) and the process is repeated.

In at least one embodiment, the evacuated tube boiler is a hydronic boiler and part of a hydronic heating system for a dwelling, wherein the effluent conduit (20) transports the heated second fluid (30), typically water, to heat exchangers or radiators throughout the dwelling and the influent conduit (18) transports the second heating fluid (30) from the heat exchangers or radiators to the hydronic boiler, forming a closed loop conduit system.

Figure 1:
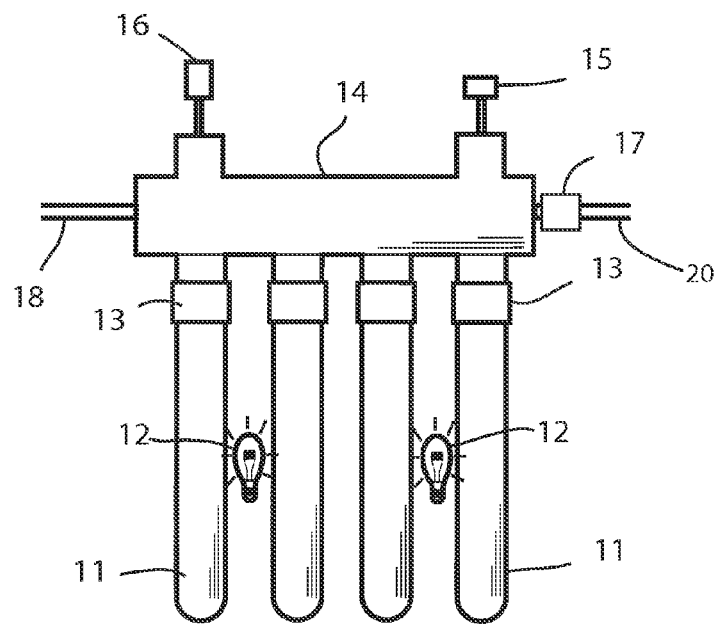
FIG. 1 illustrates one aspect of an evacuated tube boiler constructed in accordance with the invention, showing the front of the boiler.
Figure 2:
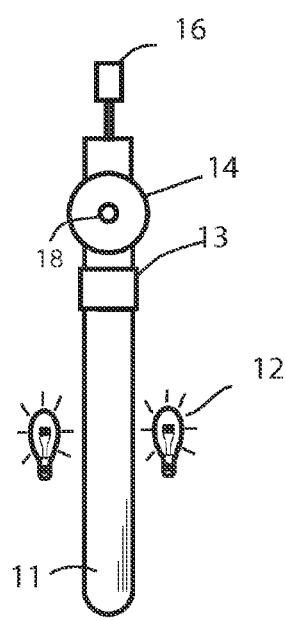
FIG. 2 illustrates a left side view of the boiler of FIG. 1.
Figure 3:
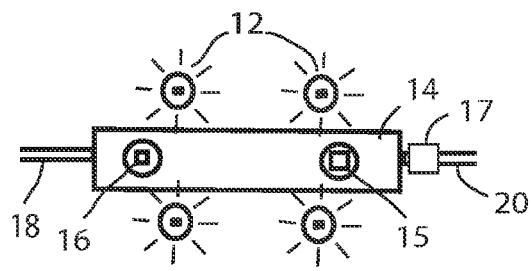
FIG. 3 illustrates a top view of the boiler of FIG. 1.
Figure 4:
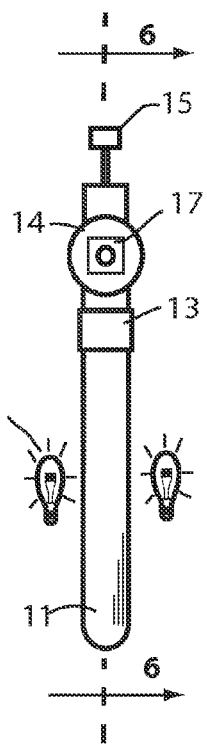
FIG. 4 illustrates a right side view of the boiler of FIG. 1.

Turning to each of the figures specifically, FIG. 1 illustrates a front view of an evacuated tube boiler constructed in accordance with one embodiment. One or more light sources (12) are in proximity and position to radiate light and/or thermal energy to the one or more evacuated tubes (11). FIG. 2 shows a left side view of the evacuated tube boiler with the influent conduit (18) in association with the header, as well as an optional temperature indicator and/or temperature control device (16). FIG. 3 shows a top view of the evacuated tube boiler illustrating the influent conduit (18) and effluent conduit (20) in association with the header (14) as well as the optional temperature indicator and/or temperature control device (16). Also illustrated in FIG. 3 are an optional pressure relief valve and/or expansion tank (15) and an optional circulating pump (17). FIG. 4 shows the elements of FIGS. 1-3 from a right side view. FIG. 5 shows the elements of FIGS. 1-3 from a bottom view. Also illustrated in the figures, in at least one embodiment, the evacuated tubes (11) may be attached to a header (14) by way of a coupling (13). FIG. 6 shows a cross section of the header (14) and evacuated tubes in the plane indicated in FIG. 4. FIG. 6 shows the evacuated tubes (11) and header (14), operatively connected to form a continuous interior volume (26). A first heating fluid (28), typically water, occupies the interior volume (26) and is able to flow freely between the evacuated tubes (11) and the header (14). In FIG. 6, the first heating fluid (28) and its direction of flow are represented by first heating fluid arrows (28). Also shown in FIG. 6, passing through the header (14) and surrounded by the first heating fluid (28), is a header conduit (21). The header conduit (21) may or may not be coiled as illustrated in FIG. 6, and may or may not contain other devices to increase its path or surface area within the first heating fluid (28) as a means to increase heat exchange between the first heating fluid (28) and second heating fluid (30). In FIG. 6, the second heating fluid (30) and its direction of flow are represented by second heating fluid arrows (30). An influent conduit (18) provides a means of conducting the second heating fluid (30), typically water, from a source to the header conduit (21) within the header (14), where the second heating fluid (30) absorbs heat from the first heating fluid (28) through the walls of the header conduit (21). The second heating fluid (30) does not mix with the first heating fluid (28), but flows from a source through the header to a point of use as represented by second heating fluid arrows (30) The effluent conduit (20) conducts the second heating fluid (30) from the header conduit (21) to a point of use. In at least one embodiment, the flow of the second heating fluid (30) may be a closed loop, by way of example, from the point of use to the evacuated tube boiler and from the evacuated tube boiler back to the point of use.

It is not necessary that the one or more evacuated tubes be operatively connected to a single header. It is envisioned that some embodiments may contain multiple headers, with corresponding header conduits that are operatively connected to a conduit system. Multiple headers may be connected in parallel or in series to form an evacuated tube boiler.

When in operation, the one or more artificial light sources (12) emit light and/or thermal energy to the evacuated tubes (11) which in turn heat the first heating fluid (28), which in turn flows or circulates through the internal volume (26) of the of the evacuated tubes (11) and the header (14), typically by way of heating convection. The first heating fluid (28) transfers heat through the header conduit (21), to the second heating fluid (30) within the header conduit (21). The second heating fluid (30) then exits the header (14) and header conduit (21) through the effluent conduit (20) to the point of use or storage. The influent conduit (18) provides the header conduit (21) with second heating fluid to be heated and the process is repeated. In at least one example, where the evacuated tube boiler is use as a hydronic boiler to heat a dwelling, the second heating fluid (30) flows, by way of the effluent conduit (20) to heat exchangers or radiators throughout the dwelling. The second heating fluid (30) having dissipated heat to the ambient air by way of the heat exchangers or radiators returns to the hydronic boiler by way of the influent conduit (18) and the process is repeated.

Fluid may be moved through the conduit system by any means available, including heating convection, gravity, or in one or more embodiments, by way of a circulating pump (17). The header (14) or conduit system may optionally include a temperature indicator and/or a temperature control device (16), by way of example an aquastat. The temperature indicator and/or temperature control device or aquastat may be operatively connected to a means of controlling the amount of light emitted from the light sources as a means of controlling the temperature of the first heating fluid and ultimately the second heating fluid circulating through the conduit system. A non-limiting means for controlling the amount of light emitted from the artificial light sources (12) would be by controlling the amount electrical energy available. In addition, or in the alternative, the temperature indicator and/or temperature control device (16) may be in operable communication with a circulating pump (17) so as to increase or decrease the rate of flow of the second heating fluid (30) through the conduit system.

Figure 8:
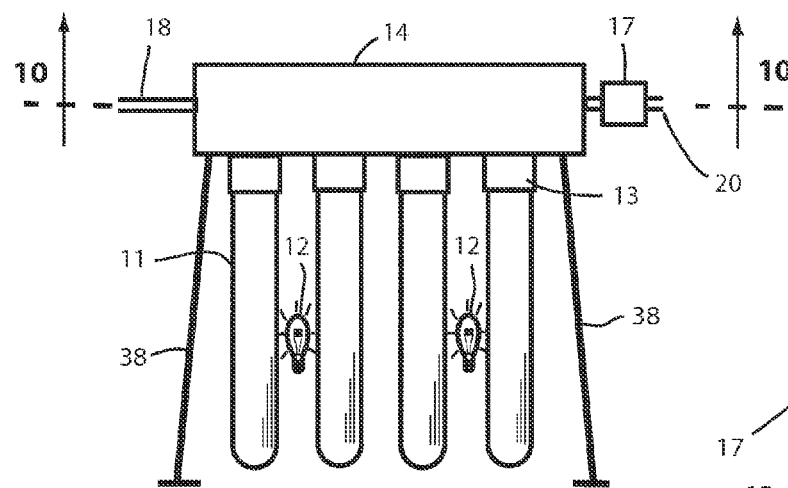
FIG. 8 illustrates another example of the invention from the front.
Figure 9:
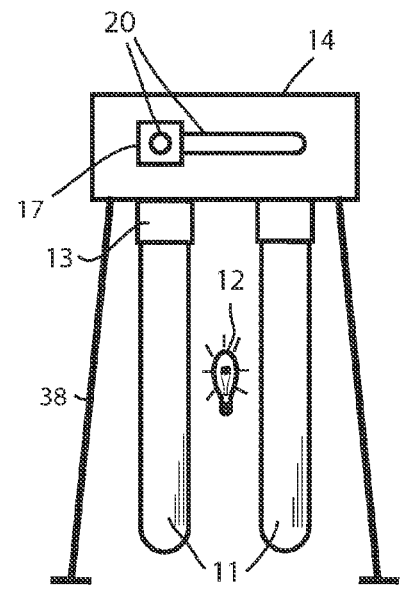
FIG. 9 illustrates a right side view of the boiler of FIG. 8.
Figure 10:
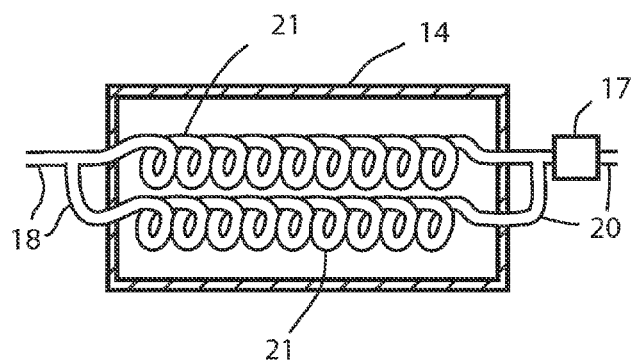
FIG. 10 illustrates a cross-section view of the header along the plane indicator indicated in FIG. 8.
Figure 11:
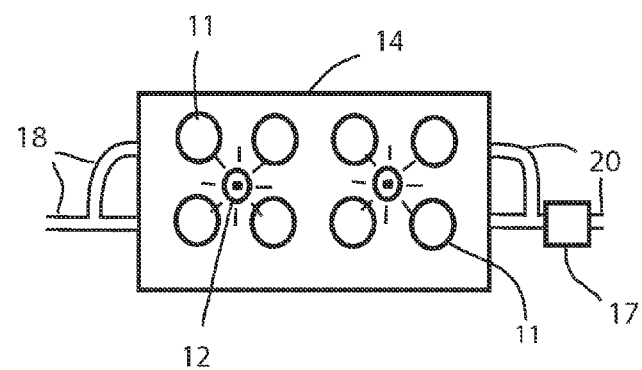
FIG. 11 illustrates a bottom view of the invention as illustrated in FIGS. 8-10.

In addition, one or more embodiments may include a means to relieve pressure (15). As illustrated in FIGS. 1-4, a means to relieve pressure (15) may be associated with the header (14) to reduce the possibility a rupture of the header. In addition, or in the alternative, a means to relieve pressure (15) may be associated with the conduit system, to prevent rupture of the conduit system. Non-limiting examples of means to relieve pressure include a pressure relief valve and/or a pressure expansion tank to accommodate the increased pressure which occurs with increased temperature FIGS. 8-11 illustrated one or more embodiments of the evacuated tube boiler where the evacuated tubes (11) are arranged around the artificial light sources (12). Illustrated in FIG. 9, is one non-limiting example of a frame (38) which may support the evacuated tube boiler as a free standing unit. It is envisioned that the frame (38) may support any one or more of the elements of the hydronic boiler. As illustrated in FIG. 10, it is envisioned that the evacuated tube boiler is not limited to a single example containing one influent conduit (18), one header conduit (21), and one effluent conduit (20). FIG. 10 illustrates a cross section view of the header (14) along the plane indicated in FIG. 8, showing at least one embodiment with a branching or a plurality of influent conduits (18), a branching or a plurality of header conduits (21), and a branching or a plurality of effluent conduits (20), associated with the header (14).

Figure 12:
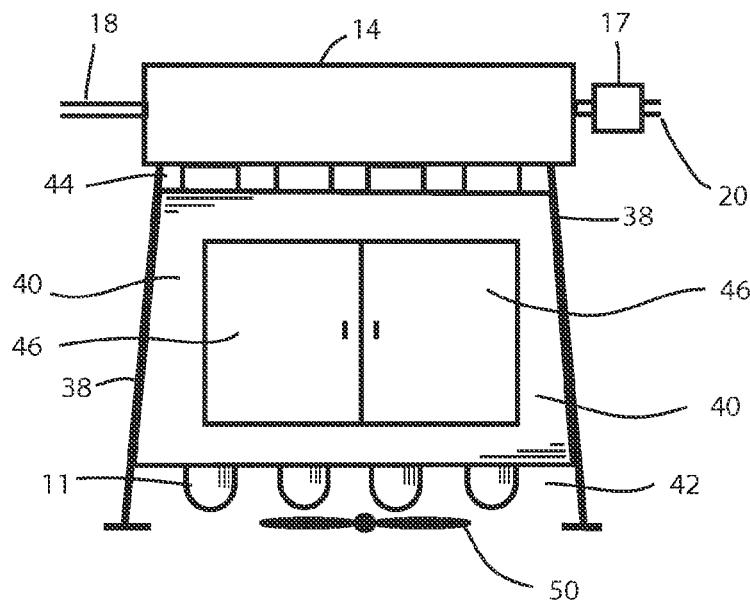
FIG. 12 illustrates one embodiment as shown in FIG. 8, also comprising a cabinet.
Figure 13:
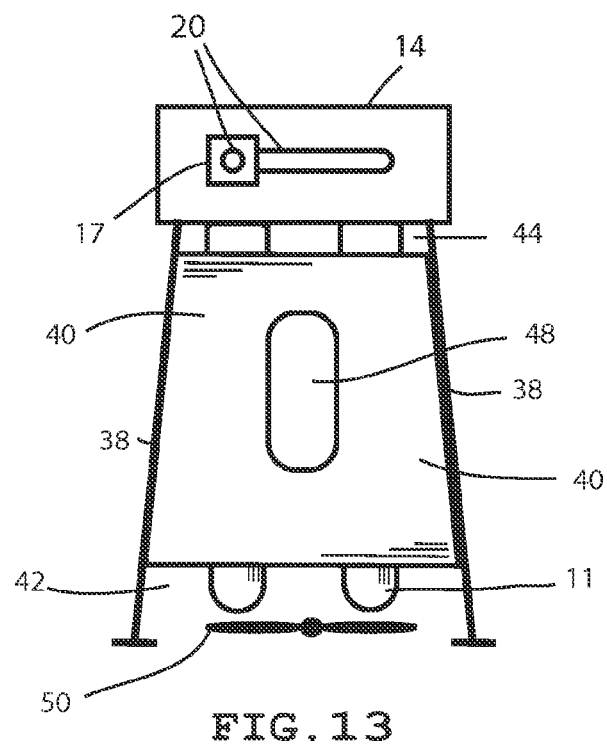
FIG. 13 illustrates a right side view of the embodiment shown in FIG. 12.

FIGS. 12-13 illustrates one non-limiting example of an evacuated tube boiler which further includes a cabinet (40). The cabinet may be attached to the frame (38), and may completely or partially surround the artificial light source (12), and evacuated tubes (11). The cabinet (40) may comprise an interior reflective surface to reflect light and/or thermal energy back to the evacuated tubes (11) where it will be absorbed by first heating fluid (28). One non-limiting example of a reflective surface is polished aluminum. The cabinet (40) may also comprise insulating material, preferably exterior to the reflective surface, so as to retain heat, which will be radiated back to the evacuated tubes (11) and absorbed by the first heating fluid (28). At least one embodiment may contain one or more intake areas (42), by way of example, intake air passages or intake vents, and/or one or more exhaust areas (44), by way of example, exhaust air passages or exhaust vents, as well as one or more fans (50) to facilitate air flow through the cabinet (40) and as a means of controlling the air temperature within the cabinet (40). In at least one embodiment, the cabinet (40) may contain doors (46) and/or access panels (48) which may be opened or removed to allow maintenance to be performed on the evacuated tube boiler. The cabinet (40) may increase the efficiency of the evacuated tube boiler and/or shield operators from light and heat produced by the artificial light sources.

It is also envisioned that one or more embodiments of the evacuated tube boiler may contain components typically associated with hydronic boiler systems, on the header and/or the conduit system, including but not limited to: zone valve(s); manifold drain valve(s); air eliminators; pressure regulator(s); expansion tank(s); pressure relief valve; aquastat(s); circulating pump(s); temperature indicator(s); pressure indicator(s); conduit flow throttle valve(s); conduit fill valve(s) and boiler control unit(s) capable of controlling voltage and signals for all of the above. The precise configuration of the elements of the evacuated tube boiler as described herein and illustrated in the figures, is meant to be non-limiting. It is appreciated that alternative configurations may be utilized, provided the elements preform their intended function.

Methods of manufacturing or assembling the evacuated tube boiler are known in the art and within the ability of the skilled craftsman or boiler technician. The components of the evacuated tube boiler other than the evacuated tubes may be comprised of any material impermeable to fluid and able to withstand the operating temperatures and pressures of the first heating fluid, and second heating fluid, including but not limited to, aluminum, stainless steel, polyvinyl chloride, or the like. The header is constructed in such a way as to accept the header conduit as well as any optional components, by way of example, the temperature sensors and/or pressure relief valve or expansion tank, and may be sealed if necessary with any fluid resistant adhesive or sealant capable of withstanding the operating temperatures and pressures. The evacuated tubes may be attached to the header using any tight fit and/or purpose designed couplings, which provide fluid tight bonds capable of withstanding the operating temperatures and pressures of the first heating fluid, with or without the aid of an adhesive.

Operation

In operation, activating the electric power source will supply electrical power to artificial light source as well as other optional components by way of example the circulating pump and/or aquastat. The artificial light source will then heat the evacuated tubes, in turn heating the first heating fluid, which will circulate through the header, transferring heat to the second heating fluid within the header conduit. The second heating fluid will exit the header and header conduit, through the effluent conduit either by heating convection or may be aided by an optional circulating pump. If the evacuated tube boiler is used to heat a dwelling, the second heating fluid will circulate to the heat exchangers or radiators throughout the dwelling by way of the effluent conduit. The heat exchangers or radiators exchange heat with the ambient air to heat the dwelling, whereby the second heating fluid is cooled. The cooled second heating fluid is returned to the header by way of the influent conduit and the process is repeated.

In a preferred embodiment the user will operate the evacuated tube boiler using an interface much like any other boiler system. In at least one embodiment, the evacuated tube boiler would self-regulate the desired temperature of fluid in header or conduit system or both. This may be accomplished with a programmable aquastat or a thermostat in operable communication with an aquastat. The user may program into the aquastat or thermostat a desired upper and lower temperature threshold, whereby the aquastat would regulate the temperature of heated fluid inside the header or conduit system. By way of example, as fluid temperature in the header or conduit system falls below a programmed threshold, the aquastat increases electrical energy to the artificial light source until programmed temperature threshold is reached. In contrast, if the fluid temperature in the header or conduit system rises above a programmed threshold, the aquastat decreases electrical energy to the artificial light source until the temperature falls to the programmed threshold. In a similar manner, an aquastat may be used to control a circulating pump. Alternatively, a circulating pump may operate independently.

It is envisioned that in at least one embodiment, the evacuated tube boiler is not limited to a hydronic boiler for heating a dwelling. The evacuated tube boiler may be used to heat any fluid for any use. Other non-limiting examples include providing a hot water supply for residential or industrial use. In this embodiment the second heating fluid would consist of water and the conduit system would transfer water from a first reservoir or source to a second reservoir or point of use. The first reservoir containing water to be heated and the second reservoir containing the heated water.

Artificial Light Sources

The term "artificial light source" as used herein is meant to refer to electrical devices or electrical lights or lamps capable of emitting light and/or thermal energy. Artificial light sources are well known in the art. Preferred examples are artificial light sources that emit maximum light and/or thermal energy. These include artificial lights or lamps that emit in the infrared range. In a preferred embodiment, the one or more artificial lights will produce a temperature in the first heating fluid of about 90° F. degrees or more. In one preferred embodiment, the one or more artificial light sources are halogen light sources. Halogen lights or lamps are an extremely bright and efficient light source. By way of non-limiting example, the Inventor has produced a working example of an evacuated tube boiler which utilizes Philips, Halogen T3, 150 watt lamps as artificial light sources. The artificial lights are arranged in proximity and position to emit light and/or thermal energy to the evacuated tubes. Proximity as used herein is meant to describe the distance from the artificial light source to at least one evacuated tube. Non-limiting examples of proximity include about 0.5 inches to about 24 inches. Preferred examples include from about 0.1 inch to about 10 inches. More preferred examples include about 0.1 inch to about 5 inches. In most preferred embodiments, the proximity and position of the lights are that which optimally increases the temperature of the first heating fluid. A non-limiting example of an evacuated tube boiler constructed by the Inventor, utilized 8 Solar Vacuum Tubes and 2 Philips, Halogen T3, 150 watt lights, with a proximity of 1.5 inches from the surface of the bulb to the surface of at least one evacuated tube.

Evacuated Tubes

Figure 7:
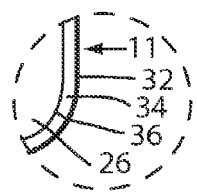
FIG. 7 illustrates a detailed view of a typical evacuated tube used in the invention.

The term "evacuated tube" as used herein is meant to refer to glass tubes typically designed for use in solar heating systems. As illustrated in FIG. 7, evacuated tubes (11) typically comprise a transparent outer wall (32) and an inner wall (36), the inner wall surrounding an internal volume (26) designed to contain a gas or liquid to be heated, typically water. Between the outer wall (32) and inner wall (36) is an evacuated space (34) which provides insulation. Typically incorporated into or on to one or more surfaces of the inner wall (36) are reflective and/or absorbance materials designed to optimally reflect light and/or absorb heat from sun light. Solar energy passes through the double walled exterior of the tubes to the absorbance layer. Heat is absorbed and retained by the gas or heating fluid in the internal volume (26). The heated fluid circulates within the internal volume (26) of the evacuated tube, typically by way of convection, where it may be removed and used directly or transferred to a second heating system. Non-limiting examples of evacuated tubes include, Solar Vacuum Tubes (Clean Republic SODO LLC, 920 S. Holgate St. #106, Seattle, Wash. 98134).

Conduit System

The term "conduit system" as used herein is meant to refer to a system of tubes, pipes, or passage ways for conducting the second heating fluid to and/or from the evacuated tube boiler for its intended use. In addition to an influent conduit, a header conduit, and an effluent conduit, other conduit elements may include reservoir conduits, heat exchanger conduits, radiator conduits, intermediate conduits, or the like, as necessary to conduct the second heating fluid for its intended use. The conduit system may conduct fluid from a source or reservoir through the evacuated tube boiler to a point of use, or storage reservoir, or may form a closed loop. By way of example, a conduit system for heating water may comprise an influent conduit, a header conduit, and an effluent conduit, the influent conducting the fluid to be heated, referred to herein as the second heating fluid, from the source or source reservoir to the evacuated tube boiler, or more specifically to the header conduit, and the effluent conduit conducting the heated fluid from the evacuated tube boiler or more specifically the header conduit, to the point of use or storage reservoir. In at least one embodiment the source reservoir and the storage reservoir may be the same, thereby forming a closed loop conduit system which continuously heats a reservoir of fluid. In at least one embodiment an evacuated tube boiler may be a hydronic boiler used to heat a dwelling, whereby the conduit system is a closed loop, the influent conduit conducting water from the heat exchangers or radiators to the hydronic boiler or header conduit and the effluent conduit conducting heated water from the hydronic boiler or header conduit, to the heat exchangers or radiators. Movement of fluid through the conduit may be by any appropriate means, including but not limited to a circulating pump, heating convection, and gravity.

The term "water" as used herein is meant to refer to aqueous solutions and includes aqueous solutions that contain additives. Non-limiting examples of additives include agents to prevent freezing, agents to prevent corrosion, and the like.

Any means may be used to assemble the conduit system provided it adequately contains the fluid and is capable of withstanding operating temperatures and pressures. It is anticipated that in at least one embodiment, an evacuated tube boiler may be fitted to existing conduit systems designed to operate with the conventional electric or gas powered boilers currently in use.

From the aforementioned description is an artificial light and evacuated tube boiler. As such, those skilled in the art will appreciate that the concept, upon which this disclosure is based, may readily be utilized as a basis for the designing of other structures, methods, and systems for carrying out the several purposes of the present invention. Therefore, the claims include such equivalent constructions insofar as they do not depart from the spirit and the scope of the present invention.

The invention claimed is:

1. An apparatus for heating fluid comprising:
   a) one or more artificial light sources in external proximity to one or more evacuated tubes;
   b) each of the one or more evacuated tubes comprising, a transparent outer wall, an inner wall, an evacuated space enclosed within said inner and outer wall, and an internal volume surrounded by said inner wall;
   c) the one or more internal volumes of the one or more evacuated tubes operatively connected to a header, to form a common internal volume, the common internal volume containing a first heating fluid;
   d) a conduit system comprising an influent conduit, a header conduit, and an effluent conduit, the header conduit in contact with the first heating fluid;
   e) a second heating fluid;
   f) wherein the influent conduit, conducts the second heating fluid to the header conduit, and the effluent conduit, conducts second heating fluid away from the header conduit;
   g) wherein the one or more evacuated tubes capture thermal energy from the one or more artificial light sources thereby heating the first heating fluid to about 90 degrees Fahrenheit or greater, wherein the first heating fluid transfers heat to the second heating fluid within the header conduit, and wherein the effluent conduit conducts the second heating fluid from the header conduit to a point of use or storage reservoir.

2. The apparatus of claim 1, wherein the one or more artificial light sources consists of one or more halogen light sources.

3. The apparatus of claim 1, wherein the external proximity is selected from the group consisting of about 0.1 inch to about 10.0 inches.

4. The apparatus of claim 1, wherein the external proximity consists of about 1.5 inches.

5. The apparatus of claim 1 further comprising an aquastat in position to sense a temperature of the first heating fluid or the second heating fluid, and in operable communication to a means for increasing or decreasing electrical power to the artificial light source.

6. The apparatus of claim 1 wherein the conduit system further comprises a circulating pump.

7. The apparatus of claim 1, wherein at least one of the conduit system or the header further comprise a means to relieve pressure.

8. The apparatus of claim 1, wherein the first heating fluid consists of a liquid.

9. The apparatus of claim 1, further comprising a cabinet:
   a) the cabinet at least partially surrounding the one or more artificial light sources and one or more evacuated tubes;
   b) the cabinet further comprising a reflective inner surface;
   c) wherein at least some of the thermal energy emitted from the artificial light source is reflected onto the evacuated tubes.

10. A system for heating a dwelling, comprising:
    a) the apparatus of claim 1, wherein the conduit system is a closed loop conduit system further comprising one or more heat exchangers or radiators located where heating is desired; and
    b) wherein the second heating fluid circulates through the closed loop conduit system comprising the one or more heat exchangers or radiators providing heat to the dwelling.

11. An apparatus for heating fluid comprising:
    a) one or more halogen light sources in external proximity to one or more evacuated tubes;
    b) each of the one or more evacuated tubes comprising, a transparent outer wall, an inner wall, an evacuated space enclosed within said inner and outer wall, and an internal volume surrounded by said inner wall;
    c) the one or more internal volumes of the one or more evacuated tubes operatively connected to a header to form a common internal volume, the common internal volume containing a first heating fluid;
    d) a conduit system comprising an influent conduit, a header conduit, and an effluent conduit, the header conduit in contact with the first heating fluid;
    e) a second heating fluid;
    f) wherein the influent conduit, conducts the second heating fluid to the header conduit and the effluent conduit, conducts second heating fluid away from the header conduit;
    g) wherein the one or more evacuated tubes capture thermal energy from the one or more halogen light sources thereby heating the first heating fluid to about 90 degrees Fahrenheit or greater, wherein the first heating fluid transfers heat to the second heating fluid within the header conduit, and wherein the effluent conduit conducts the second heating fluid from the header conduit to a point of use or storage reservoir.

12. The apparatus of claim 11, wherein the external proximity is selected from the group consisting of about 0.1 inch to about 10.0 inches.

13. The apparatus of claim 11, wherein the external proximity consist of about 1.5 inches.

14. The apparatus of claim 11, further comprising an aquastat in position to sense a temperature of the first heating fluid or the second heating fluid, and in operable communication to a means for increasing or decreasing electrical power to the artificial light source.

15. The apparatus of claim 11, wherein the conduit system further comprises a circulating pump.

16. The apparatus of claim 11, wherein at least one of the conduit system or the header further comprise a means to relieve pressure.

17. The apparatus of claim 11, wherein the first heating fluid consists of a liquid.

18. The apparatus of claim 11, further comprising a cabinet:
    a) the cabinet at least partially surrounding the one or more artificial light sources and one or more evacuated tubes;
    b) the cabinet further comprising a reflective inner surface;
    c) wherein at least some thermal energy emitted from the artificial light source is reflected onto the evacuated tubes.

19. A system for heating a dwelling, comprising:
    a) the apparatus of claim 11, wherein the conduit system is a closed loop conduit system further comprising one or more heat exchangers or radiators located where heating is desired; and
    b) wherein the second heating fluid circulates through the closed loop conduit system comprising the one or more heat exchangers or radiators providing heat to the dwelling.

* * * * *